(12) United States Patent
Krishnan et al.

(10) Patent No.: US 11,733,356 B2
(45) Date of Patent: Aug. 22, 2023

(54) SENSOR APPARATUS WITH DRAINAGE

(71) Applicant: Ford Global Technologies, LLC, Dearborn, MI (US)

(72) Inventors: Venkatesh Krishnan, Canton, MI (US); Segundo Baldovino, Novi, MI (US); Navvab Khajehosseini, Canton, MI (US); Rashaun Phinisee, Ypsilanti, MI (US); Vigidharan Ramanathan, Southgate, MI (US); Sunil Reddy Patil, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 567 days.

(21) Appl. No.: 16/993,411

(22) Filed: Aug. 14, 2020

(65) Prior Publication Data
US 2022/0050180 A1 Feb. 17, 2022

(51) Int. Cl.
*G01S 7/48* (2006.01)
*G01S 7/481* (2006.01)
*G01S 17/89* (2020.01)
*G01D 11/24* (2006.01)
*G01D 11/26* (2006.01)

(52) U.S. Cl.
CPC .......... *G01S 7/4813* (2013.01); *G01D 11/245* (2013.01); *G01D 11/26* (2013.01); *G01S 17/89* (2013.01)

(58) Field of Classification Search
CPC ...... G01S 7/4813; G01S 17/89; G01S 17/931; G01D 11/245; G01D 11/26
See application file for complete search history.

(56) References Cited

U.S. PATENT DOCUMENTS

| 10,627,488 | B2* | 4/2020 | Dubey | G01S 7/4813 |
| 10,704,894 | B2* | 7/2020 | Mori | G01S 17/42 |
| 10,953,809 | B2* | 3/2021 | Krishnan | G05D 1/0088 |
| 2021/0025982 | A1* | 1/2021 | Robertson, Jr. | G01S 7/497 |

\* cited by examiner

*Primary Examiner* — Francis C Gray
(74) *Attorney, Agent, or Firm* — Frank A. MacKenzie; Bejin Bieneman PLC

(57) ABSTRACT

A sensor apparatus includes a cylindrical sensor window defining an axis oriented vertically and a ramp. The sensor window includes an exterior surface facing radially outward relative to the axis. The ramp is on the exterior surface of the sensor window. The ramp includes a leading surface and a trailing surface. The leading surface and the trailing surface are elongated parallel to the axis.

18 Claims, 3 Drawing Sheets

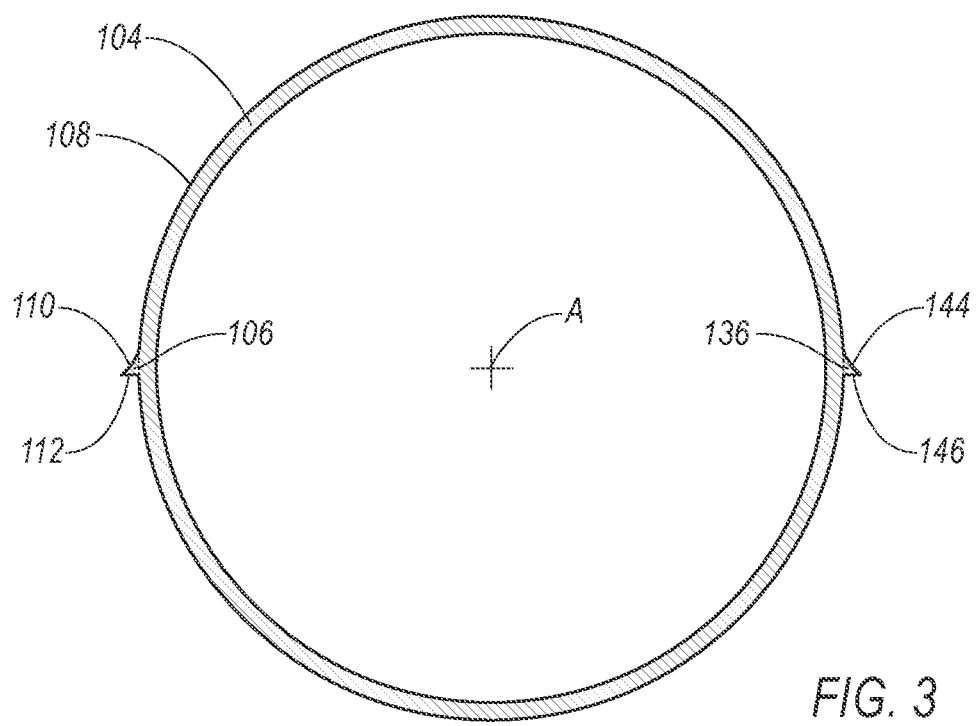
FIG. 3
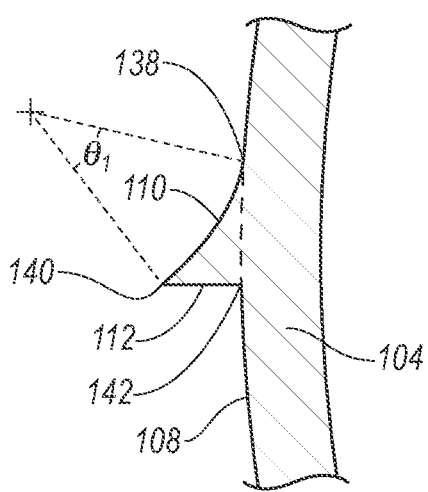 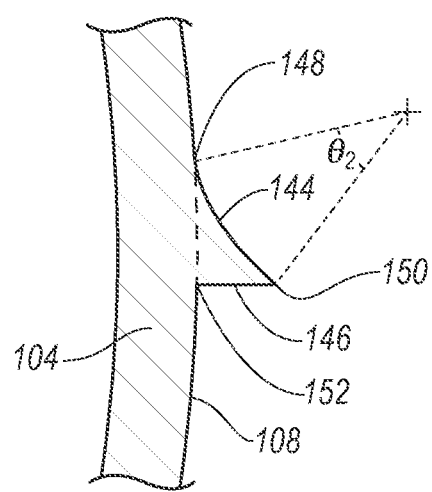
FIG. 4　　　FIG. 5

SENSOR APPARATUS WITH DRAINAGE

BACKGROUND

Vehicles, such as autonomous or semi-autonomous vehicles, typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

BRIEF DESCRIPTION OF THE DRAWINGS

FIG. 3 is a top cross-sectional view of the sensor apparatus.

FIG. 4 is a portion of the top cross-sectional view.

FIG. 5 is another portion of the top cross-sectional view.

DETAILED DESCRIPTION

Figure 1:
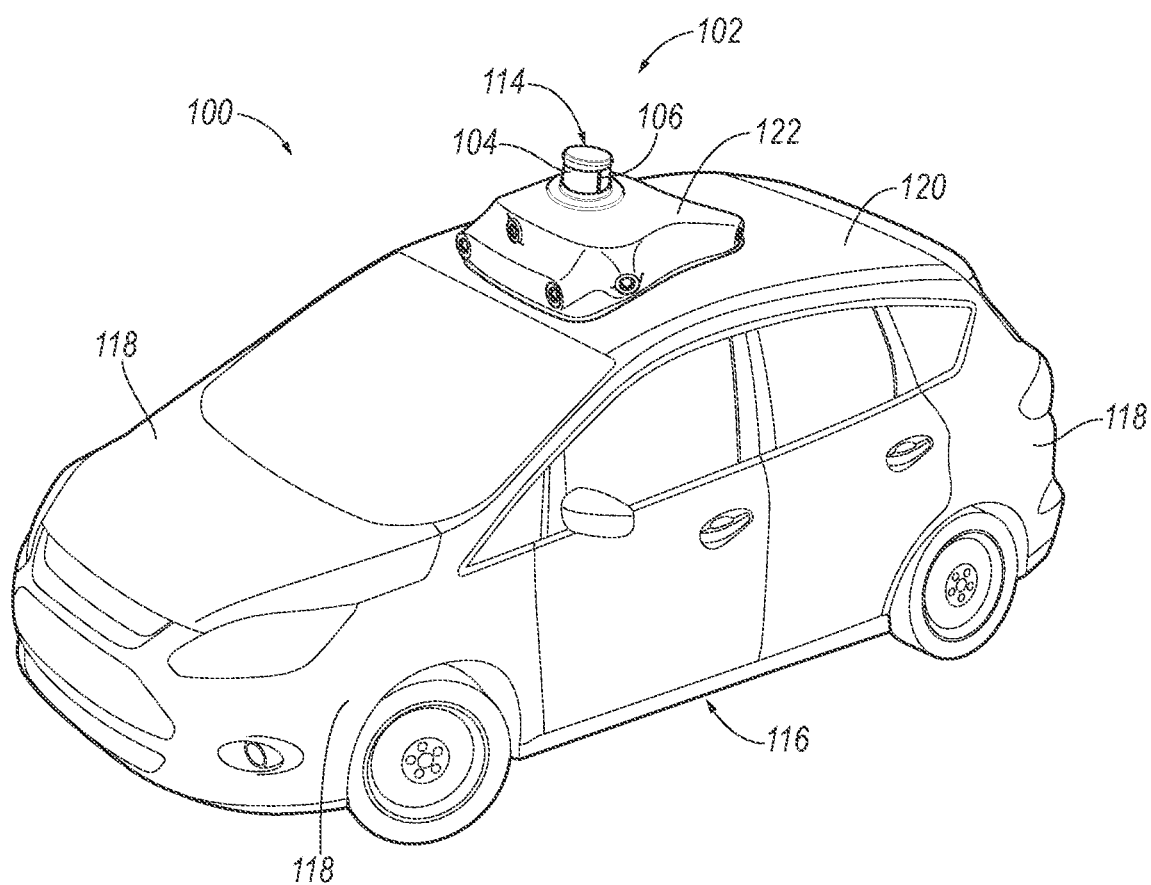
FIG. 1 is a perspective view of an example vehicle including the sensor apparatus.

A sensor apparatus includes a cylindrical sensor window defining an axis oriented vertically and a ramp. The sensor window includes an exterior surface facing radially outward relative to the axis. The ramp is on the exterior surface of the sensor window. The ramp including a leading surface and a trailing surface. The leading surface and the trailing surface are elongated parallel to the axis.

The ramp may include an upper end and a lower end, and the leading surface and the trailing surface may form a constant cross-section from the upper end to the lower end. A path length of the leading surface in the constant cross-section may be longer than a path length of the trailing surface in the constant cross-section.

The sensor window may extend along the axis from a top edge to a bottom edge, the upper end of the ramp may be at the top edge of the sensor window, and the lower end of the ramp may be at the bottom edge of the sensor window.

The leading surface may extend from a leading edge at the sensor window to a trailing edge at the trailing surface. The leading surface may be tangent to the sensor window at the leading edge.

The leading surface and the trailing surface may form an acute angle in a plane orthogonal to the axis at the trailing edge.

The leading surface may be curved from the leading edge to the trailing edge. A radius of curvature of the leading surface may be constant from the leading edge to the trailing edge.

A cross-section of the leading surface orthogonal to the axis may form a sector of circle of from 30° to 50°. The cross-section of the leading surface orthogonal to the axis may form a sector of circle of from 35° to 42°.

A radial distance relative to the axis from the exterior surface of the sensor window to the trailing edge may be from 1 millimeter to 5 millimeters.

The ramp may be a first ramp, the leading surface may be a first leading surface, the trailing surface may be a first trailing surface, the sensor apparatus may further include a second ramp on the exterior surface of the sensor window, the second ramp may include a second leading surface and a second trailing surface, and the second leading surface and the second trailing surface may be elongated parallel to the axis. The first ramp and the second ramp may be positioned 180° from each other relative to the axis.

The first ramp and the second ramp may be mirror images of each other across a plane containing the axis.

The sensor window and the ramp may be a single piece.

The sensor apparatus may further include a sensing device having a field of view through the sensor window. The ramp may be transparent to a wavelength of light detectable by the sensing device.

With reference to the Figures, a sensor apparatus 102 for a vehicle 100 includes a cylindrical sensor window 104 defining an axis A oriented vertically and a first ramp 106. The sensor window 104 includes an exterior surface 108 facing radially outward relative to the axis A. The first ramp 106 is on the exterior surface 108 of the sensor window 104. The first ramp 106 includes a first leading surface 110 and a first trailing surface 112. The first leading surface 110 and the first trailing surface 112 are elongated parallel to the axis A.

The first ramp 106 helps to shed water such as rain droplets from the sensor apparatus 102, specifically from the sensor window 104. Providing the first ramp 106 on a side of the sensor window 104 provides a sharp point for the rain droplets to fly off the sensor window 104 instead of sticking as the rain droplets slide from a front-facing portion of the sensor window 104 around the side of the sensor window 104 to a rear-facing portion of the sensor window 104. The sensor apparatus 102 thus helps prevents the rain droplets from distorting light detected by a sensor 114 that includes the sensor 114 window.

With reference to FIG. 1, the vehicle 100 may be any suitable type of automobile, e.g., a passenger or commercial automobile such as a sedan, a coupe, a truck, a sport utility vehicle, a crossover vehicle, a van, a minivan, a taxi, a bus, etc. The vehicle 100, for example, may be an autonomous vehicle. In other words, the vehicle 100 may be autonomously operated such that the vehicle 100 may be driven without constant attention from a driver, i.e., the vehicle 100 may be self-driving without human input. Autonomous operation can be based in part on data received from the sensor 114.

The vehicle 100 includes a body 116. The body 116 includes body panels 118 partially defining an exterior of the vehicle 100. The body panels 118 may present a class-A surface, e.g., a finished surface exposed to view by a customer and free of unaesthetic blemishes and defects. The body panels 118 include, e.g., a roof 120, etc.

A housing 122 for the sensor 114 and other sensors is attachable to the vehicle 100, e.g., to one of the body panels 118 of the vehicle 100, e.g., the roof 120. For example, the housing 122 may be shaped to be attachable to the roof 120, e.g., may have a shape matching a contour of the roof 120. The housing 122 may be attached to the roof 120, which can provide the sensor 114 with an unobstructed field of view of an area around the vehicle 100. The housing 122 may be formed of, e.g., plastic or metal.

Figure 2:
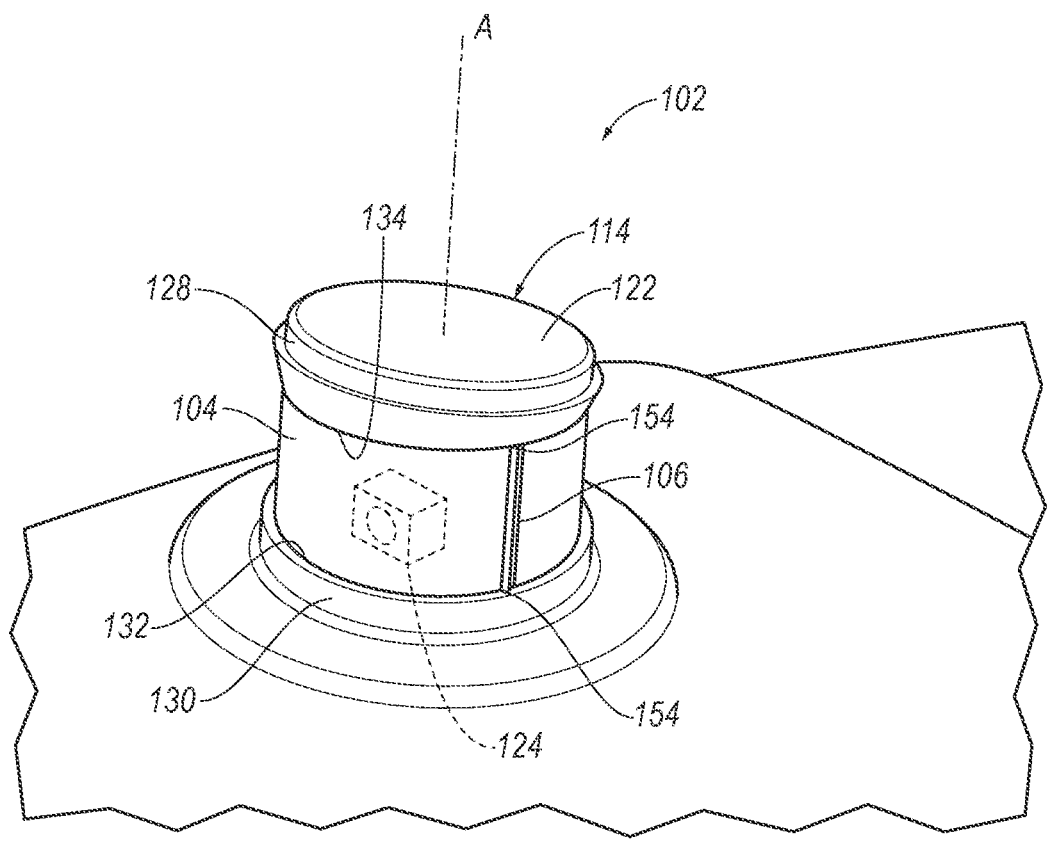
FIG. 2 is a perspective view of the sensor apparatus.

With reference to FIG. 2, the sensor apparatus 102 includes the sensor 114. The sensor 114 is supported by the housing 122. The sensor 114 can be disposed on top of the housing 122 at a highest point of the housing 122. The sensor 114 has a cylindrical shape and defines the axis A.

The sensor 114 may be designed to detect features of the outside world; for example, the sensor 114 may be a radar sensor, a scanning laser range finder, a light detection and ranging (LIDAR) device, or an image processing sensor such as a camera. In particular, the sensor 114 may be a LIDAR device, e.g., a scanning LIDAR device. A LIDAR device detects distances to objects by emitting laser pulses at a particular wavelength and measuring the time of flight for the pulse to travel to the object and back. The operation of the sensor 114 is performed by a sensing device 124 inside a sensor housing 126. The sensing device 124 has a field of view through the sensor window 104 encompassing a region from which the sensor 114 receives input.

The sensor 114 includes the sensor housing 126. The sensor housing 126 includes a sensor-housing cap 128, the sensor window 104, and a sensor-housing base 130. The sensor-housing cap 128 is disposed directly above the sensor window 104, and the sensor-housing base 130 is disposed directly below the sensor window 104. The sensor-housing cap 128 and the sensor-housing base 130 are vertically spaced apart by a height of the sensor window 104.

The sensor window 104 is oriented generally vertically, i.e., extends up and down. The sensor window 104 is cylindrical and defines the axis A, which is oriented vertically. The sensor window 104 extends around the axis A. The sensor window 104 can extend fully around the axis A, i.e., 360°, or partially around the axis A. The sensor window 104 extends along the axis A, i.e., vertically, from a bottom edge 132 to a top edge 134. The bottom edge 132 contacts the sensor-housing base 130, and the top edge 134 contacts the sensor-housing cap 128. The sensor window 104 includes the exterior surface 108 facing radially outward relative to the axis A. The sensor window 104 has an outer diameter, i.e., a diameter of the exterior surface 108. The outer diameter of the sensor window 104 may be the same as an outer diameter of the sensor-housing cap 128 and/or of the sensor-housing base 130; in other words, the sensor window 104 may be flush or substantially flush with the sensor-housing cap 128 and/or the sensor-housing base 130. "Substantially flush" means a seam between the sensor window 104 and the sensor-housing cap 128 or sensor-housing base 130 does not cause turbulence in air flowing along the sensor window 104. At least some of the sensor window 104 is transparent with respect to whatever medium the sensing device 124 is capable of detecting. For example, if the sensor 114 is a LIDAR device, then the sensor window 104 is transparent with respect to visible light at the wavelength generated and detectable by the sensing device 124. The field of view of the sensing device 124 extends through the sensor 114 window.

With reference to FIGS. 2 and 3, the sensor apparatus 102 includes the first ramp 106 and a second ramp 136. The first ramp 106 and second ramp 136 are transparent with respect to visible light at the wavelength generated and detectable by the sensing device 124. The placement of the first ramp 106 and second ramp 136 on the sensor window 104 thus does not obstruct the field of view of the sensing device 124. For example, the first ramp 106 and second ramp 136 can be made of the same material as the sensor window 104. The sensor window 104, the first ramp 106, and the second ramp 136 can be a single piece, i.e., made of a single, uniform piece of material with no seams, joints, fasteners, or adhesives holding it together. Alternatively, the first ramp 106 and second ramp 136 can be attached, e.g., adhered, to the exterior surface 108 of the sensor 114 window.

With reference to FIG. 3, the first ramp 106 and second ramp 136 are on the exterior surface 108 of the sensor window 104. The first ramp 106 and second ramp 136 are positioned 180° from each other relative to the axis A. The first ramp 106 and second ramp 136 are positioned at respective farthest points in vehicle-lateral directions on the sensor window 104, i.e., a leftmost point and a rightmost point. The first ramp 106 and second ramp 136 are each 90° relative to the axis A from a vehicle-forward direction.

With reference to FIG. 4, the first ramp 106 includes the first leading surface 110 and the first trailing surface 112. The first leading surface 110 extends from a first leading edge 138 at the sensor window 104 to a first trailing edge 140 at the first trailing surface 112. The first trailing surface 112 extends from the first trailing edge 140 at the first leading surface 110 to a first rear edge 142 at the sensor window 104. The first leading surface 110 faces in a partially vehicle-forward direction. The first trailing surface 112 faces in an at least partially vehicle-rearward direction.

With reference to FIG. 5, the second ramp 136 includes a second leading surface 144 and a second trailing surface 146. The second leading surface 144 extends from a second leading edge 148 at the sensor window 104 to a second trailing edge 150 at the second trailing surface 146. The second trailing surface 146 extends from the second trailing edge 150 at the second leading surface 144 to a second rear edge 152 at the sensor window 104. The second leading surface 144 faces in a partially vehicle-forward direction. The second trailing surface 146 faces in an at least partially vehicle-rearward direction. The first ramp 106 and the second ramp 136 are mirror images of each other across a plane containing the axis A, specifically a plane extending vertically and longitudinally, i.e., forward and rearward.

Returning to FIG. 2, the first ramp 106 and the second ramp 136 each include an upper end 154 and a lower end 156. The upper ends 154 are at the top edge 134 of the sensor window 104. The lower ends 156 are at the bottom edge 132 of the sensor window 104. The first ramp 106 and second ramp 136 are elongated parallel to the axis A from their lower ends 156 to their upper ends 154. Experimental results by the inventors have shown that elongation parallel to the axis A sheds water better than a path of elongation that is oblique to the axis A. The first leading surface 110 and first trailing surface 112 form a constant cross-section from the upper end 154 to the lower end 156 of the first ramp 106, and the second leading surface 144 and second trailing surface 146 form a constant cross-section from the upper end 154 to the lower end 156 of the second ramp 136. The cross-sections are taken orthogonal to the direction of elongation, i.e., orthogonal to the axis A. The cross-section of the first ramp 106 is described above and below with respect to FIG. 4, and the cross-section of the second ramp 136 is described above and below with respect to FIG. 5.

Returning to FIG. 4, the first leading surface 110 is curved from the first leading edge 138 to the first trailing edge 140. The first leading surface 110 can have a constant radius of curvature from the first leading edge 138 to the first trailing edge 140, i.e., the first leading surface 110 can form a sector of circle in the cross-section orthogonal to the axis A. The first leading surface 110 can form a sector of circle covering an angle $\theta_1$ of the circle. The angle $\theta_1$ is from 30° to 50°, e.g., from 35° to 42°, e.g., approximately 41.4°. Experimental results by the inventors have shown that the sensor apparatus 102 sheds water most effectively at $\theta_1=41.4°$ and avoids significant pooling within the ranges described.

Returning to FIG. 5, the second leading surface 144 is curved from the second leading edge 148 to the second trailing edge 150. The second leading surface 144 can have a constant radius of curvature from the second leading edge 148 to the second trailing edge 150, i.e., the second leading surface 144 can form a sector of circle in the cross-section orthogonal to the axis A. The second leading surface 144 can form a sector of circle covering an angle $\theta_2$ of the circle. The angle $\theta_2$ is from 30° to 50°, e.g., from 35° to 42°, e.g., approximately 41.4°.

With reference to FIGS. 4 and 5, the first leading surface 110 is tangent to the sensor window 104 at the first leading edge 138. This permits water to smoothly flow from the sensor window 104 to the first ramp 106. The first leading surface 110 and the first trailing surface 112 form an acute angle in a plane orthogonal to the axis A at the first trailing edge 140. This helps the first ramp 106 shed the water instead of the water collecting on the first leading surface 110. The second leading surface 144 is tangent to the sensor window 104 at the second leading edge 148. The second leading surface 144 and the second trailing surface 146 form an acute angle in a plane orthogonal to the axis A at the second trailing edge 150.

A path length of the first leading surface 110 in the constant cross-section from the first leading edge 138 to the first trailing edge 140 is longer than a path length of the first trailing surface 112 in the constant cross-section from the first trailing edge 140 to the first rear edge 142. A distance in the constant cross-section from the first leading edge 138 to the first trailing edge 140 is longer than a distance in the constant cross-section from the first trailing edge 140 to the first rear edge 142. The relative sizes of the first leading surface 110 and first trailing surface 112 help the first ramp 106 have a ramp-like shape that sheds water. A radial distance relative to the axis A from the exterior surface 108, i.e., from the diameter of the exterior surface 108, to the first trailing edge 140 is from 1 millimeter to 5 millimeters. Experimental results by the inventors have shown that a height of the first ramp 106 from the exterior surface 108 in that range helps shed water without significantly increasing drag. A path length of the second leading surface 144 in the constant cross-section from the second leading edge 148 to the second trailing edge 150 is longer than a path length of the second trailing surface 146 in the constant cross-section from the second trailing edge 150 to the second rear edge 152. A distance in the constant cross-section from the second leading edge 148 to the second trailing edge 150 is longer than a distance in the constant cross-section from the second trailing edge 150 to the second rear edge 152. A radial distance relative to the axis A from the exterior surface 108, i.e., from the diameter of the exterior surface 108, to the second trailing edge 150 is from 1 millimeter to 5 millimeters.

The disclosure has been described in an illustrative manner, and it is to be understood that the terminology which has been used is intended to be in the nature of words of description rather than of limitation. Terms such as "front," "forward," "back," "rearward," "left," "right," "lateral," etc., are understood relative to the vehicle 100. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A sensor apparatus comprising:
   a cylindrical sensor window defining an axis oriented vertically, the sensor window including an exterior surface facing radially outward relative to the axis; and
   a ramp on the exterior surface of the sensor window, the ramp including a leading surface and a trailing surface;
   wherein the leading surface and the trailing surface are elongated parallel to the axis.

2. The sensor apparatus of claim 1, wherein the ramp includes an upper end and a lower end, and the leading surface and the trailing surface form a constant cross-section from the upper end to the lower end.

3. The sensor apparatus of claim 2, wherein a path length of the leading surface in the constant cross-section is longer than a path length of the trailing surface in the constant cross-section.

4. The sensor apparatus of claim 2, wherein the sensor window extends along the axis from a top edge to a bottom edge, the upper end of the ramp is at the top edge of the sensor window, and the lower end of the ramp is at the bottom edge of the sensor window.

5. The sensor apparatus of claim 1, wherein the leading surface extends from a leading edge at the sensor window to a trailing edge at the trailing surface.

6. The sensor apparatus of claim 5, wherein the leading surface is tangent to the sensor window at the leading edge.

7. The sensor apparatus of claim 5, wherein the leading surface and the trailing surface form an acute angle in a plane orthogonal to the axis at the trailing edge.

8. The sensor apparatus of claim 5, wherein the leading surface is curved from the leading edge to the trailing edge.

9. The sensor apparatus of claim 8, wherein a radius of curvature of the leading surface is constant from the leading edge to the trailing edge.

10. The sensor apparatus of claim 8, wherein a cross-section of the leading surface orthogonal to the axis forms a sector of circle of from 30° to 50°.

11. The sensor apparatus of claim 10, wherein the cross-section of the leading surface orthogonal to the axis forms a sector of circle of from 35° to 42°.

12. The sensor apparatus of claim 5, wherein a radial distance relative to the axis from the exterior surface of the sensor window to the trailing edge is from 1 millimeter to 5 millimeters.

13. The sensor apparatus of claim 1, wherein the ramp is a first ramp, the leading surface is a first leading surface, and the trailing surface is a first trailing surface, the sensor apparatus further comprising a second ramp on the exterior surface of the sensor window, the second ramp including a second leading surface and a second trailing surface, wherein the second leading surface and the second trailing surface are elongated parallel to the axis.

14. The sensor apparatus of claim 13, wherein the first ramp and the second ramp are positioned 180° from each other relative to the axis.

15. The sensor apparatus of claim 13, wherein the first ramp and the second ramp are mirror images of each other across a plane containing the axis.

16. The sensor apparatus of claim 1, wherein the sensor window and the ramp are a single piece.

17. The sensor apparatus of claim 1, further comprising a sensing device having a field of view through the sensor window.

18. The sensor apparatus of claim 17, wherein the ramp is transparent to a wavelength of light detectable by the sensing device.

\* \* \* \* \*